WILLIAM M. HUGHES, OF SAN FRANCISCO, CALIFORNIA.

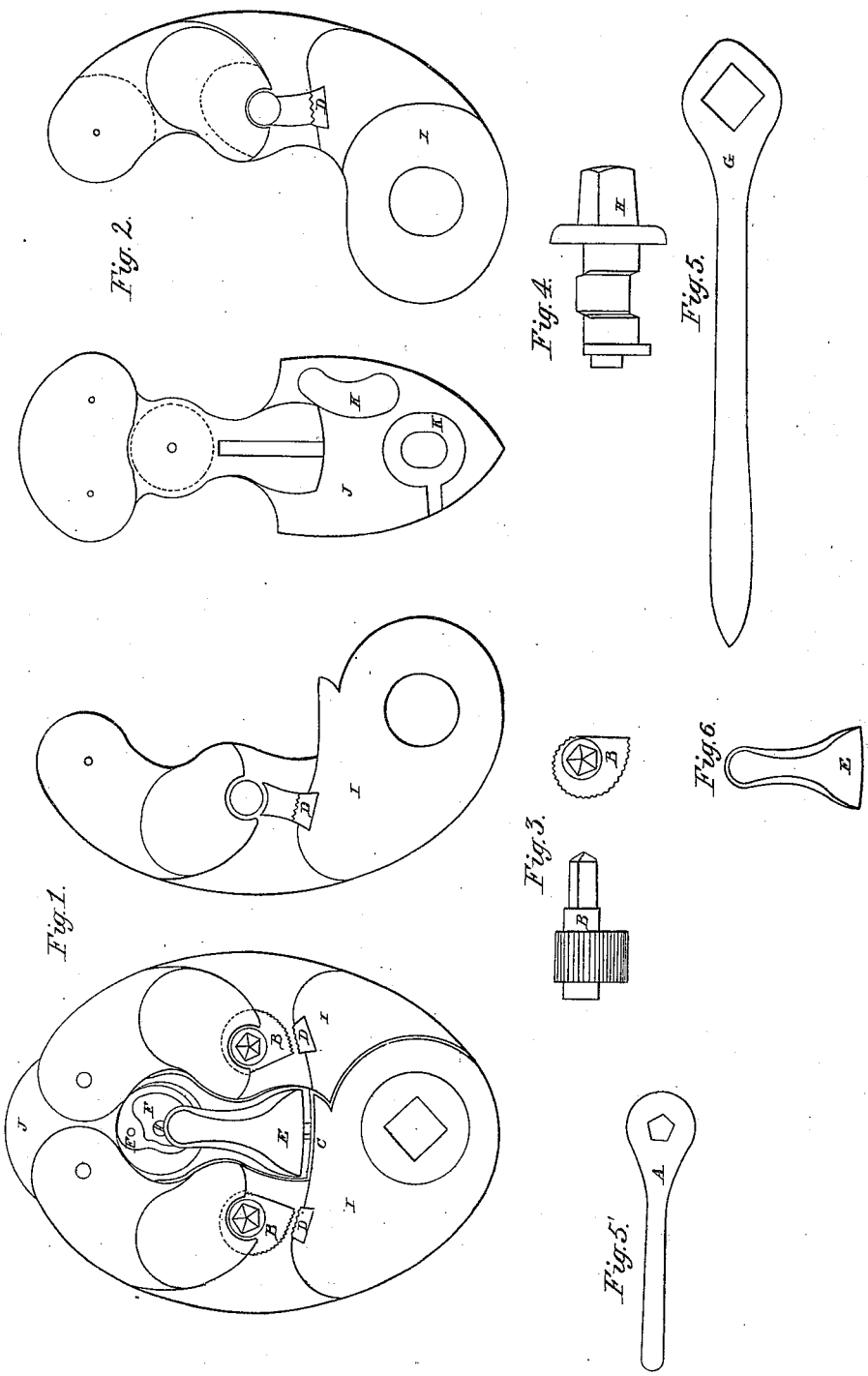

Letters Patent No. 87,260, dated February 23, 1869.

IMPROVED TIRE-UPSETTER.

The Schedule referred to in these Letters Patent and making part of the same.

*To whom these presents shall come:*

Be it known that I, WILLIAM M. HUGHES, of the city and county of San Francisco, State of California, have made a new and useful invention in a Tire-Upsetter.

The following description, together with the accompanying drawings, with the figures and letters thereon, will enable any one skilled in the art to make and use the same.

The adjustable handles A A operate the cams, or eccentrics, B B, which are used to secure the tire while under pressure.

The object in having the handles adjustable is to secure a longer and sharper curvature.

The convex, E, is operated by the eccentric, F, which eccentric is combined with a wheel cast upon the same, which serves to release the bolt upon which it turns from strain.

The convex slide E is used to preserve the form of the tire while being operated upon.

The tire is held upon the two pieces D D, set in slots in the concave, C, which is formed upon the parts I I.

Said parts, it will be observed, lap into each other, so as to receive and be acted upon by a compound eccentric, H, which turns upon its centre in the bed-plate J, operated by the lever G, the bed-plate being formed to correspond with the parts already described.

The object of the concave, K, in the bed-plate, in which the compound wheel and eccentric revolve, is to relieve the bolt upon which the wheel turns from strain.

Figure 1, the machine.
Figure 2, main parts separate.
Figure 3, corrugated eccentrics.
Figure 4, compound eccentrics.
Figure 5, adjustable handles.
Figure 6, convex.

Claim.

I claim the combination of the parts I I, plate J, the clamp E, the wheel and eccentric F, the compound F, eccentric H, the handles A A, lever G, and the cams, or eccentrics, B B, substantially as shown, for the purposes specified.

WM. M. HUGHES.

Witnesses:
FRANK E. BROWN,
G. WINGATE.